United States Patent [19]

Walsh et al.

[11] Patent Number: 5,956,481

[45] Date of Patent: Sep. 21, 1999

[54] METHOD AND APPARATUS FOR PROTECTING DATA FILES ON A COMPUTER FROM VIRUS INFECTION

[75] Inventors: James E. Walsh, Kirkland; Ebbe H. A. Altberg, Bellevue, both of Wash.

[73] Assignee: Microsoft Corporation, Redmond, Wash.

[21] Appl. No.: 08/797,485

[22] Filed: Feb. 6, 1997

[51] Int. Cl.$^6$ .................................................. G06F 12/16
[52] U.S. Cl. ............................................. 395/186; 380/4
[58] Field of Search ..................... 395/183.14, 183.15, 395/183.12, 186, 682, 680; 364/580; 380/4

[56] References Cited

U.S. PATENT DOCUMENTS

| | | | |
|---|---|---|---|
| 5,257,381 | 10/1993 | Cook | 395/682 |
| 5,398,196 | 3/1995 | Chambers | 364/580 |
| 5,684,875 | 11/1997 | Ellenberger | 380/4 |

OTHER PUBLICATIONS

Leach, Norvin, "Utility vendors zero in on Word macro virus (McAfee Associates Inc's VirusScan, Symantec Corp's Norton Anti–Virus anti–virus software)," *PC Week*, vol. 12, No. 42, p. 6(1), Oct. 23, 1995.

Leach, Norvin, "Utility vendors scramble to thwart MS Word virus (a Microsoft Word 'macro virus' called WinWord.Concept)," *PC Week*, vol. 12, No. 35, p. 10(1), Sep. 4, 1995.

Rothenberg, Mathew, "Cross–platform virus hits Word: disrupts template commands but won't destroy data (Microsoft Word 6 word processing software, Word Macro Virus), "*PC Week*, vol. 12, No. 34, p. 8(1), Aug. 28, 1995.

"Information on the Macro Virus Protection Tool," updated on May 10, 1996.

"Microsoft Word Macro Virus Protection Tool Readme," Oct. 9, 1995, pp. 1–7, Copyright© 1995 Microsoft Corporation.

*Primary Examiner*—Ly Hua
*Attorney, Agent, or Firm*—Jones & Askew

[57] ABSTRACT

Protection of data files on a computer system from infection or damage by a computer virus. A virus protection system can detect either an external or internal open file event for a file maintained on a local or remote computer. Typically, the protection system is implemented as an internal component of the program module that processes the files protected by the protection system. Prior to responding to a detected open file event, an inquiry is conducted to determine whether the file is likely to contain a virus. If so, a notice is generated to indicate that the file may contain a virus, thereby advising of the possible danger of spreading the virus to other files if the file opening is completed. If the file is not likely to contain the virus, the response to the detected open file event is completed by opening the file for processing by the program module.

34 Claims, 5 Drawing Sheets

METHOD AND APPARATUS FOR PROTECTING DATA FILES ON A COMPUTER FROM VIRUS INFECTION

TECHNICAL FIELD

The present invention relates generally to virus protection for a computer, and in particular to an improved system for protecting data files residing on a computer from infection by a computer virus that can potentially damage file content.

BACKGROUND OF THE INVENTION

The use of a personal computer has now become an integral part of the life of users in home and business environments. Computer users expect and, indeed, demand reliable performance of their computers and associated computer programs. In view of these expectations, developers of computer hardware and software strive to design and offer reliable computer systems that operate in a well-defined fashion. For example, if a user of a word processing program enters the appropriate keystroke to open a document, the user expects the program to open the document for operation. If the word processing program fails to operate in the expected manner, then the user can quickly grow frustrated with the program and either seek a remedy from the program provider or abandon future use of the program. Clearly, computer developers and users alike have a vested interest in the reliable performance of a computer system.

Unfortunately, a minority of computer users enjoy modifying computer systems to perform in an unintended or unexpected manner. Computer hackers with a mischievous sense of humor, as well as those with a more sinister personality, have developed computer viruses that "infect" computer files, resulting in modification of file content or alteration of operation by the underlying executable program. Typically, a virus can be executed when the infected file is loaded into memory of a computer, which allows the virus to infect other files residing on the computer.

Because viruses can often cause damage to computer files residing on a computer, the computer industry has addressed this problem by offering programs for protecting computer files from known viruses. These virus protection programs are typically implemented as utility programs separate from the executable programs that they are intended to protect from virus infection. These utility programs typically scan files residing on a local computer to determine whether a file is infected with a recognizable virus. In response to detecting an infected file, the virus protection program can alert the user about the infected file. In addition, the virus protection program can attempt to "cure" the infected file by removing the virus from the file and the local machine.

A utility program typically scans local files in response to booting the computer or during a predetermined time period for operation of a computer. Alternatively, if you access a file on a local machine, the utility program can scan the file at that time. Because utility programs typically offer virus protection by scanning files residing on a local machine, these utility programs can fail to address certain file events that may arise in a computer network environment, such as accessing a file on a remote server. For example, a utility program cannot scan a file that resides outside of the local user's machine, such as a file accessed via a remote server.

In mid-1995, Microsoft Corporation, the developer of the popular "WORD" word processing program, faced the problem of contamination of word processing documents by a virus readily distributed over computer networks. The virus, which Microsoft called the "WORD Prank Macro" virus or the "Concept" virus, could infect all documents that a user saved in the "WORD" program after the program loaded an infected file on the user's machine. This macro virus could attack a document by inserting a copy of itself into the data file. To quickly address this problem, Microsoft offered users a "patch" solution which was implemented as a set of routines separate from the "WORD" program. A user could obtain the patch program, known as "scanprot.dot," from Microsoft Corporation by downloading the routines from a remote server on the Internet. Once installed, the patch could trap certain known open file events and, in response, examine a file to be opened for possible virus infection. In the event that a file containing a component associated with a virus was detected, the patch program would advise the user of the potential risk of opening the suspicious file.

Although the patch solved the virus problem for many users of the "WORD" program, this patch solution suffered from the inherent disadvantage of being separate from the word processing program. In contrast to built-in protection, the patch represents a set of routines that a user must install and operate to obtain virus protection. In a large corporate computing environment, the installation and administration of a separate virus protection program for a large group of users represents a significant project for an MIS department. Indeed, if by inadvertent error the patch is not installed for a single user in this corporate computing environment, this user's machine could become infected with the virus, and result in the spread of the virus to data files on the machine. The virus can then spread to other non-protected machines connected to the user's machine. Consequently, there is a need for a virus protection mechanism that is implemented as an integral component of an executable program, such as a word processing program.

Although the patch can offer protection of a file for selected open file events, the separate implementation of the patch prevents this solution from handling all open file events. For a word processing program, such as the "WORD" program, one will appreciate that there exists a wide variety of ways to open a document or file. External open events, such as selecting the "Open" command from a pull-down menu or double-clicking on a file displayed on the desktop, can be trapped by an event handler of the patch to initiate virus protection. The patch, however, cannot successfully detect all external open file events. In addition, internal open file events cannot be trapped by an external event handler because they are hidden within the internal code layer of the executable program. These internal open file events do not generate an action that is readily recognizable by a separate program, such as the patch solution. If all external and internal open file events cannot be addressed by a separate protection program, then it is possible for a hacker to circumvent the patch protection by exploiting this hole in the protection perimeter. To address external and internal open file events, it is necessary to incorporate virus protection within the executable program itself. Thus, there is a further need for a system for protecting a file or document from virus infection by including protection within the executable program compatible with these files.

SUMMARY OF THE INVENTION

The present invention addresses the above needs by providing a system for protecting a computer from infection by a virus that attacks data files of an executable program. The present invention also can protect against an unauthorized loading of a virus component, such as macro code, that can result in damage to data file content and to computer storage. The virus protection system can be implemented as an internal component of a program module that processes files which may contain a virus. The virus protection system can detect either an external or internal open file event for a file maintained on a local or remote computer. An external open event is an action, conducted by the program module, which can be trapped by an event handler for use by the protection system, such as a conventional FILE OPEN command selected from a menu of the program module. In contrast, an internal open event is an action conducted by the program module at an internal code layer, thereby preventing ready access to the action by an event handler. Prior to responding to the detected open file event, an inquiry is conducted to determine whether the file contains a component associated with the virus. If so, a notice is generated to indicate that the file may be infected by a virus thereby advising the user of possible danger if a normal file opening is completed. If the file is unlikely to contain the virus, the response to the detected open file event is completed by opening the file for processing by the program module.

The notice offered by the protection system can include a user interface displayed on a computer monitor to present options for responding to the detected open file event. These options can include a file open option, a cancel file open option, and a virus protection option. In response to selecting the file open option, the file can be opened in a conventional manner for operation with the program module. By selecting this option, the user bypasses virus protection and takes a chance that the file is not contaminated by a virus. A file open operation, which is normally conducted in response to a detected open file event, can be terminated in response to selecting the cancel file open option. This prevents the opening of the file and possible infection by the virus of other files residing on the computer. Alternatively, the virus protection option can be selected to protect the file from possible virus infection. In response to selection of this option, the file is opened without loading component(s) that could contain a virus. The file is typically opened in a read-only mode to prevent the user from inadvertently saving the open file, thereby replacing the original file with one that does not include certain components.

For one aspect of the present invention, the program module is an executable program, typically a word processing program, capable of processing data files or documents containing macros and/or customization routines. These components can contain certain viruses, including a macro virus that can infect a document. By opening an infected document, the macro virus can spread to other files residing on the computer. A protection routine, which is integral to the structure of the executable program, detects whether a document to be opened is likely to contain a macro virus based upon a determination of whether the document contains a macro or a customization. If either a macro or a customization is located in the document to be opened, then an advisory notice or prompt is presented to advise the user that opening the document may lead to damage by the macro virus.

The notice can offer the user with several options regarding the open document operation, including: (1) open the document in the "safe mode;" (2) proceed with normal opening of document; and (3) cancel the document opening. If the user elects to open the document in the "safe mode," the document is opened without loading any attached macros or customizations. If the user attempts to save a document loaded in the "safe mode," rather than saving the document over the previous version, a tag marking the document as a Read Only document is detected and a "Save As" dialog is presented to the user. This requires the user to enter a new file name for the open document, thereby saving the non-macro document under a new file name rather than replacing the original document containing macros.

The internal protection routine offers advantages over a prior "patch" virus protection solution by handling possible virus infection cases that the add-on solution can not handle, such as certain external open file events and internal open file events occurring at an internal code layer of the executable program, e.g., events associated with OLE and embedded documents. The prior patch program uses an event handler that can trap only certain external open file events, thereby limiting the scope of protection offered by this separate program. In contrast, because the executable program itself is responsible for opening files, the internal protection routine can detect both external and internal open events. This integral solution also can access internal data and routines of the executable program to support the virus check tasks conducted by the internal protection routine. In addition, this internal protection approach is more desirable from a user's perspective because the user does not need to install an "add-on" utility program on the computer to obtain the required virus protection. Unlike utility programs, which typically operate by scanning files on a local machine, the internal protection routine also can detect open file events for files on either a local machine or on a remote server connected to the local machine.

For another aspect of the present invention, a protection routine, also called a virus check routine, is implemented as a component internal to a program module for processing files. In response to detecting an open file event for a selected file, a determination is made whether a dofVirusCheck flag is set to true for this action. A code path within the program module, responsible for opening the file in response to the detected open file event, can pass the dofVirusCheck flag in either a true state or a false state based on the particular open file event. The code path also can pass a dofVirusNotReadOnly flag to provide an indication of whether the file should be opened in a read only mode. If the dofVirusCheck flag is set to the true state, then the virus check routine is initiated to examine whether the file to be opened contains a component associated with the macro virus. Otherwise, the file is opened in a conventional manner without protection from the virus. In this manner, the virus check routine is initiated only when required for a certain set of open file events.

If the virus check routine is initiated, an inquiry is conducted to determine if the selected file contains a macro or a customization routine. If not, the file is opened without protection because the file does not include a component associated with the macro virus. If the selected file contains either a macro or a customization routine, then a determination is made whether the selected file has been previously checked by the virus check routine during the present session of the application program. This check can be accomplished by checking the state of the fVirusPrompted flag, which is associated with the selected file. The initial state of the fVirusPrompted flag for each file opened during a session is false. If the fVirusPrompted flag is set to the true state, then the selected file has been previously checked during the present session of the application program. Consequently, the selected file can be opened without protection if the fVirusPrompted flag is true. The state of the fVirusPrompted flag can be stored in a dynamic memory with the loaded program module.

A fCheckedVirus flag can be set after completing this level of virus check operations. The default state of the fCheckedVirus flag is false. The fCheckedVirus flag is set to the true state, however, if the selected file contains a macro or customization. This state of the fCheckedVirus flag provides an indication that the selected file has been examined for macros and customizations by the virus check routine.

If the fVirusPrompted flag is set to the false state, then a determination is made whether the selected file is a template. For certain application programs, such as Microsoft's "WORD FOR WINDOWS 95" program, only templates can contain a macro or a customization. If the selected file is not a template, then the file is opened without protection because the file does not contain a macro or customization. For application programs which do not require macros or customizations to be placed in templates, this inquiry is not required and should not be implemented.

The virus check routine now determines whether the selected file is maintained in a predetermined file directory (or subdirectory of the predetermined file directory). For example, for Microsoft's "WORD FOR WINDOWS 95" program, the predetermined file directories include the User Templates Directory and the Workgroup Templates Directory. If the selected file is located in a predetermined file directory (or one of its subdirectories), the file is opened without protection because it is considered to reside in a "safe" location. For example, a file placed in a selected directory by a software vendor prior to offering the program to the public is unlikely to contain a macro virus. Likewise, a file placed in a known directory by the user and often accessed for use with the executable program is unlikely to contain the micro virus.

If the selected file is not located in a predetermined directory (or one of its subdirectories), an inquiry is conducted to determine whether a particular Global flag, the vrf.fVirusAlwaysDirty flag, is set to true, which indicates that the user has elected an option to bypass the default operation of virus protection. A Global flag is a flag not associated with any particular file or document; instead, it is applicable to all files to be opened by the program module. If this flag is set to true, then the selected file is opened without virus protection because the user has elected the option to bypass virus protection. By default, however, the vrf.fVirusAlwaysDirty flag is normally set to false to enable virus check operations.

If the particular Global flag is set to false, a notice is presented to advise the user that the file selected for opening may contain a macro virus because the file contains a macro or customization. This notice can be viewed as an express warning of file damage that might occur if the user continues the open operation without electing virus protection. The notice, presented as a user interface for the underlying program module, can display three different options for responding to the display screen. These options are typically presented as control buttons for selecting open document options, specifically (1) YES—open document in "safe mode;" (2) NO—normal open operation; and (3) CANCEL—cancel open operation.

If the "YES" button is selected, then a Read Only flag can be set to the true state to mark the selected file as a file to be opened only in Read Only mode. The Read Only flag, however, will not be set to the true state if the dofVirusNotReadOnly flag is set to the true state. A fVirusLoadSafe flag is also set to the true state in response to selecting the "YES" button. The state of the fVirusLoadSafe flag determines whether a selected file containing a macro or customization will be opened with the macro or customization loaded for operation. During the open operation, the state of the fVirusLoadSafe flag will be examined prior to accessing a macro or customization for the selected file. If the fVirusLoadSafe flag is set to true, then any macro or a customization of the selected file is not loaded or activated when the file itself is opened. If the Read Only flag is set to true, the selected document is opened as a Read Only file.

If the "NO" button is selected, then a normal file open operation is conducted to open the selected file. In other words, a possible "dirty" file is opened because any macro or customization in that file is loaded at the time that the file is opened. The fVirusLoadSafe flag is set to false for the selected file to enable the loading of any macro or customization.

If the "CANCEL" button is selected, then the file open operation is canceled and the fVirusLoadSafe flag is set to false for the selected file. This terminates the intended opening of the selected file.

For yet another aspect of the present invention, each session of the program module can be assigned a digital session key. When a selected file for which an advisory notice has been previously displayed is saved during the session, a digital signature is saved with the selected file. In response to detecting another open file event for this selected file, a comparison can be made between the digital signature saved with the selected file and the digital session key for the present session. This comparison of digital signatures can be completed after the selected file is examined to determine whether it contains a macro or customization. In other words, if the fVirusPrompted flag is set to the true state, then the digital signature check is performed. If a match is achieved, then an inquiry is conducted to determine if the fVirusLoadSafe flag is set to the true state. If not, the selected file is opened without protection. Otherwise, the selected file is opened in the "safe mode." In the absence of a match, the virus check operations are conducted as described above.

Other objects, features, and advantages of the present invention will become apparent upon reading the following specification, when taken in conjunction with the drawings and the appended claims.

DETAILED DESCRIPTION OF THE DISCLOSED EMBODIMENT

The present invention is directed to protecting data files on a computer from possible virus infection by advising a user that a file to be opened may contain a virus that can potentially damage file content or data storage of the computer. The present invention is implemented as a virus protection routine, also called a virus check routine, which determines whether a computer file selected for opening by a program module contains a component associated with a potential virus. If the file to be opened contains any component of a virus, a notice or alert can be presented to the user to support an informed decision of whether to proceed with the open file operation.

For an exemplary embodiment, the present invention is implemented as a software routine that is a component of a program module, typically an executable program, capable of processing compatible data files. In other words, the protection routine is an internal component of the program module itself. This allows the protection routine to directly handle the detection of open file events that an add-on or "patch" routine is incapable of trapping and processing, such as internal actions occurring within a code layer of the program module. Because this preferred implementation represents a built-in virus protection system, there is no need for a user to install a separate protection program to warn a user that a file to be opened may result in spreading a virus to other data files.

In one exemplary embodiment, the invention is incorporated into a word processing application program entitled "WORD FOR WINDOWS 95," marketed by Microsoft Corporation of Redmond, Wash. Briefly described, Microsoft's "WORD" program allows a user to create and to edit a document on a computer and to send the completed document to an output device, such as a printer, display device or network connected to the computer. For this embodiment of the present invention, virus protection is implemented as a routine or component internal to the "WORD" program. This allows the protection routine to readily recognize both internal and external file open events for a document that may contain a virus. Because the protection routine is implemented as an integral component of the "WORD" program, virus protection also can be offered for the opening of a document residing on either a local machine or on a remote server.

In contrast to prior virus protection programs, such as the "scanprot.dot" patch, the protection routine of the above-described exemplary embodiment is not limited to detecting certain external open file events, i.e., trapping "File Open" operations. The "scanprot.dot" patch is limited to detecting certain external open file events, whereas the present protection routine can detect both external and internal open file events. Unlike the patch, the protection routine can detect infected files that are embedded in OLE files and MAIL files.

Figure 1:
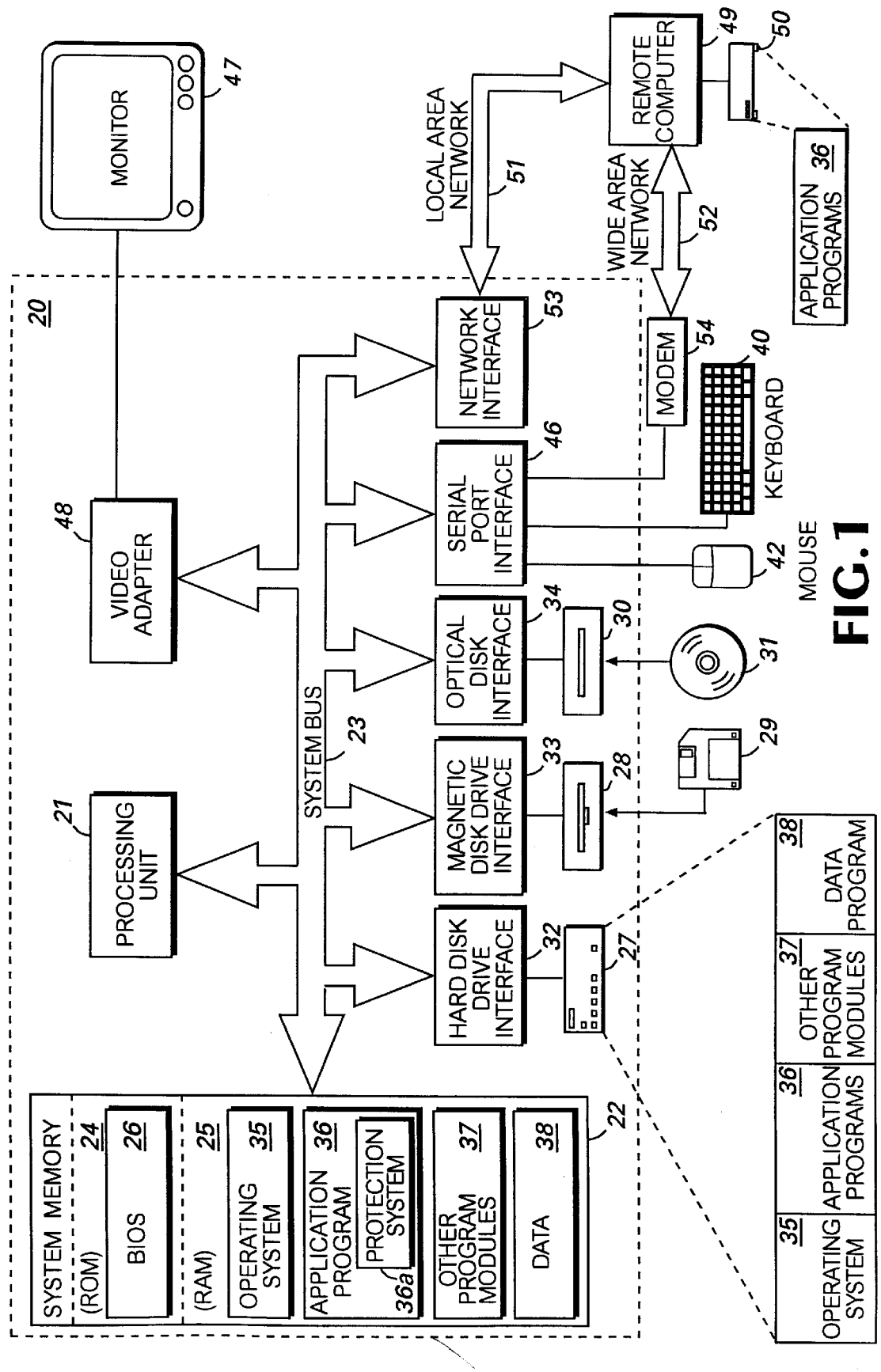
FIG. 1 is a block diagram illustrating a computer system forming the preferred operating environment for an exemplary embodiment of the present invention.

Referring now to the drawings, in which like numerals indicate like elements throughout the several views, FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, an application program 36, such as Microsoft's "WORD" program, other program modules 37, and program data 38. The application program includes a virus check routine 36a, labeled protection system, as an internal component of the executable program.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

An exemplary embodiment of the present invention is directed to protection of computer files that may contain a macro virus. A macro virus is a type of computer virus that spreads by copying itself to a data file. For a typical program module, such as a word processing program, a macro is a set of keystrokes and/or instructions recorded under a macro name. The program module can complete the instructions of a macro in response to use of the macro name within a computer file or template. For example, when you open a word processing document containing a macro, the instructions associated with the macro can be carried out by the computer system. Likewise, when you open a computer file containing a macro virus, such as the "Concept" virus, the virus is activated and transmitted to files residing in memory storage device(s) of your computer. Once the computer is infected with the macro virus, each computer file that you save is automatically infected with the macro virus. Moreover, if a remote user accesses your computer via a computer network and opens an infected file, the macro virus can be transmitted to the computer at the remote location.

A macro virus uses the macro programming language of an executable program to distribute the macro virus to data files on a computer system. A macro virus can infect a data file rather than the underlying executable program. The "Concept" virus is a macro virus that attacks documents of Microsoft's "WORD" word processing program. Once installed, the "Concept" virus causes all documents to be saved as templates. Rather than cause data loss, the "Concept" virus will replicate and distribute itself throughout documents. Other macro viruses include the "Nuclear" virus and the "DMV" virus. The "Nuclear" virus is a macro virus that causes damage to operating system files and print-outs of infected documents. The "DMV" virus is similar to the "Concept" virus and uses the "AutoClose" function to install the virus in the user's Normal template. In contrast, the "Concept" virus uses the "AutoOpen" function to install the virus in the Normal template. The "DMV" virus replicates itself to other data files of the computer system and changes the "File Save As" command.

For purposes of illustration, the program module will be described as a word processing program, such as Microsoft's "WORD" program, and the data files will be described as files or documents. An exemplary embodiment of the present invention is implemented as an internal component of this word processing program. Although this internal virus check routine does not scan a memory storage device of a computer to detect and remove viruses, the internal routine can support presentation of a notice or warning message in response to detecting the opening of a document that may contain a virus. In response to this notice, the user can select an option for further processing of the document to be opened. For example, if the user believes that the document is clean, i.e., a file not likely to contain a virus, then the user can elect to complete the opening of the document, including any components associated with the virus. On the other hand, if the user suspects that the document may be contaminated with a virus, or if the user is not certain of the source of the document, then the user can elect to open the document in a "safe mode." The election of this option opens the document without any components associated with the virus. For example, this safe mode would prevent the possible transmission of the macro virus because macros within the document are not opened at the time that the document itself is opened. The user also can elect to cancel the open operation, thereby terminating further processing of this document. Although the notice is preferably presented to the user as a display screen on a monitor, those skilled in the art will appreciate that notice information can be presented in alternative formats via other output devices, such as printers or loud speakers.

Figure 2:
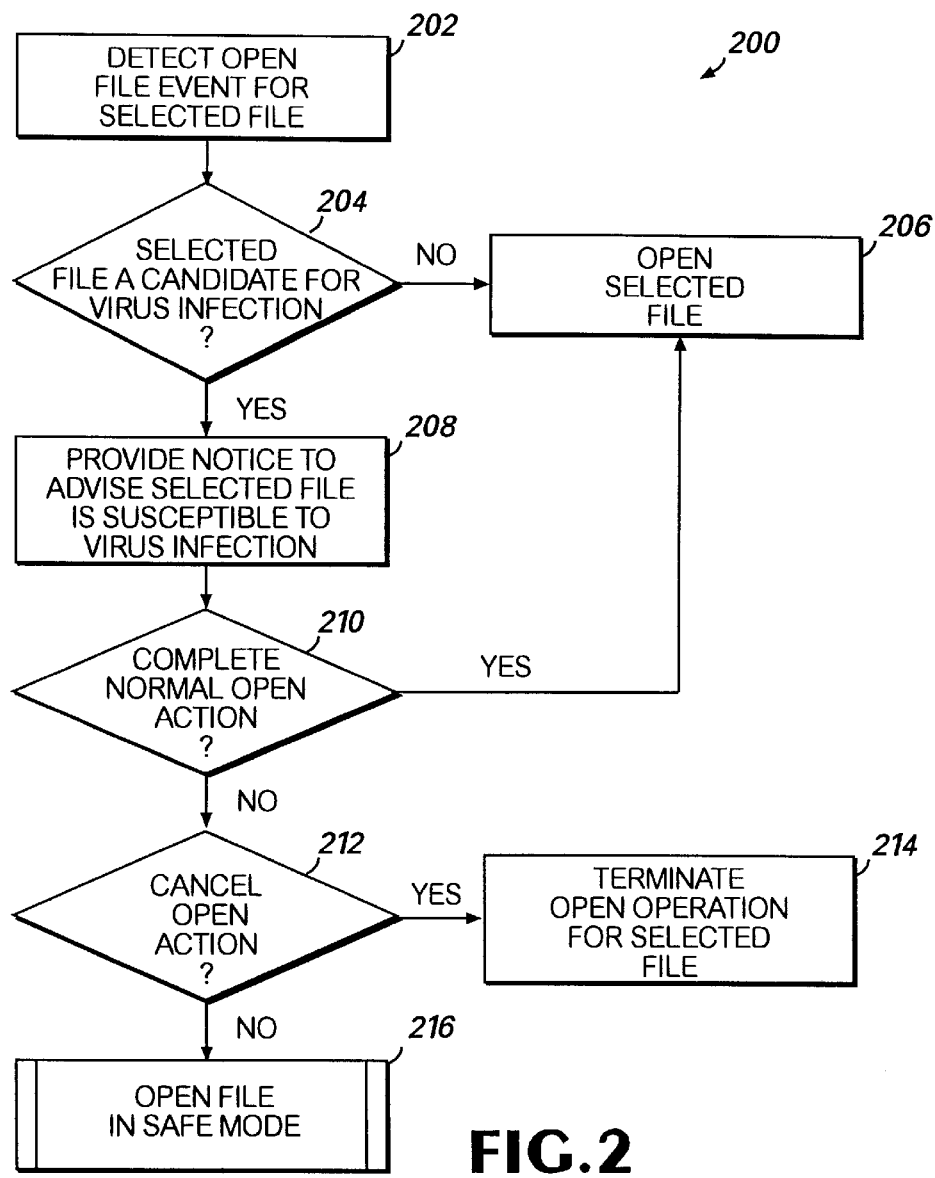
FIG. 2 is a logical flow diagram generally showing steps of a method for protecting a file from infection by a virus in accordance with an exemplary embodiment of the present invention.

Turning now to FIG. 2, which is a logical flow diagram generally describing the steps of a virus protection routine 200, an open file event is detected in step 202. The open file event initiates the opening of a file or document for processing by a program module, such as a word processing program. In response to detecting the opening of a file, an inquiry is conducted at step 204 to determine whether the file contains a known virus component. For example, if the virus-in-issue is a macro virus, such as the "Concept" virus, the file to be opened can be examined to determine whether it includes a macro or a customization. If a determination is made that the file to be opened is unlikely to contain the virus, the "NO" branch is followed from step 204 to step 206. In step 206, the file is opened by completing a conventional open operation associated with the file open event. On the other hand, if the file includes characteristics associated with a virus, the "YES" branch is followed from step 204 to step 208.

In step 208, a notice is presented to advise the user that the file to be opened may contain a virus. This notice is preferably presented as a dialog containing a warning message and various options for responding to the warning notice. Typically, these options include (1) open; (2) cancel; and (3) open in a "safe mode." A user can select a desired option by selecting from the notice a control button corresponding to the desired option.

In step 210, an inquiry is conducted to determine whether the open option has been selected by the user. If so, the "YES" branch is followed from step 210 to step 206 and the file is opened in a conventional manner for processing by the program module. This opens the file and loads any components or characteristics associated with the virus. Otherwise, the "NO" branch is followed from step 210 to step 212.

In step 212, a determination is made whether the user has selected the cancel option. If so, the "YES" branch is followed from step 212 to step 214, and the file open operation is terminated. This interrupts the completion of the open operation initiated by the open file event. Otherwise, the "NO" branch is followed from step 212 to step 216.

In step 216, the user has selected the only remaining option, the safe mode option, to open the file without any characteristic or component associated with the virus. For a macro virus, a file opened in the safe mode would not include any macros or customizations because these elements are associated with the macro virus. In addition, the file opened under the safe mode option can be treated as a "read only" file to prevent the inadvertent replacement of the original file with the opened file during a save operation. By tagging the file with a read only flag, the program module treats the opened file as a read only file that can be saved only via a "Save As" function, which requires renaming the opened file. Opening the file without a macro or customization ensures that a macro virus is not transmitted to the computer. In general, opening the file without a macro or customization does not affect the content of the file itself.

In view of the foregoing, it will be appreciated that the routine 200 can alert a user to the existence of a component in their data file that is associated with a virus, such as a macro virus. In addition, the routine 200 allows the user to open a selected data file without loading the component associated with the virus, thereby ensuring that the virus is not transmitted to the computer. This protects the computer from infection by a virus because the selected file is opened without loading a virus that may be present in the selected file.

Figure 3:
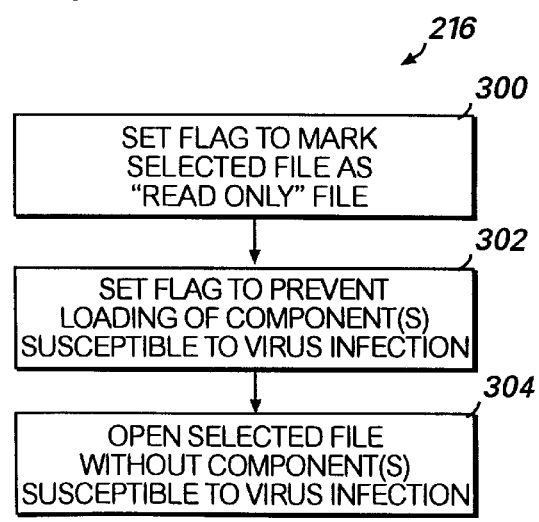
FIG. 3 is a logical flow diagram illustrating a method for safely opening a file that may contain a virus, in accordance with an exemplary embodiment of the present invention.

Referring now to FIG. 3, which illustrates in detail the task completed in step 216 of FIG. 2, the document to be opened within the safe mode is marked as a read only file in step 300. Typically, the file is marked by setting a read only flag for this file to the true state. In step 302, another flag is set to prevent the loading of any component of the file that is associated with the virus. For example, to provide macro virus protection, this flag is set to true to prevent the loading of any macro or customization within the file. In step 304, the file is opened as a "read only" file that does not include a virus component. In this manner, the file can be opened in a manner which will prevent spreading a virus to other data files on the computer.

Figure 4A:
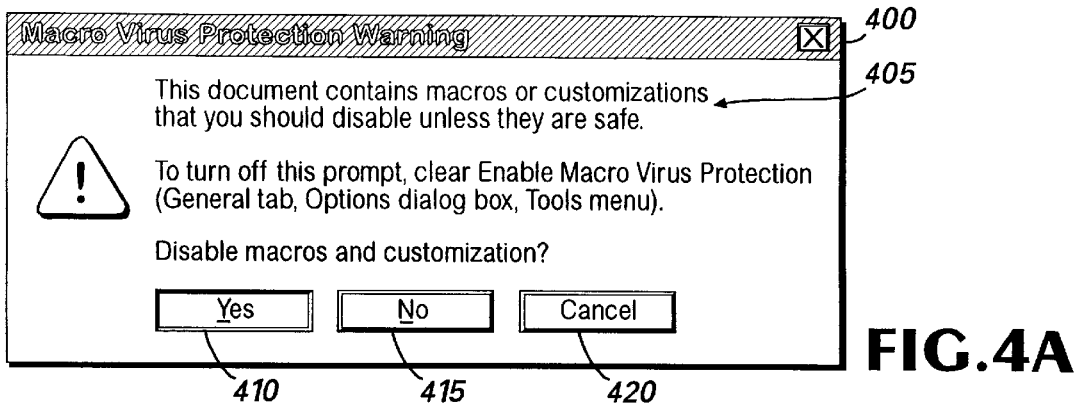
FIGS. 4A, 4B and 4C, collectively described as FIG. 4, are illustrations showing user interfaces for an exemplary embodiment of the present invention.
Figure 4B:
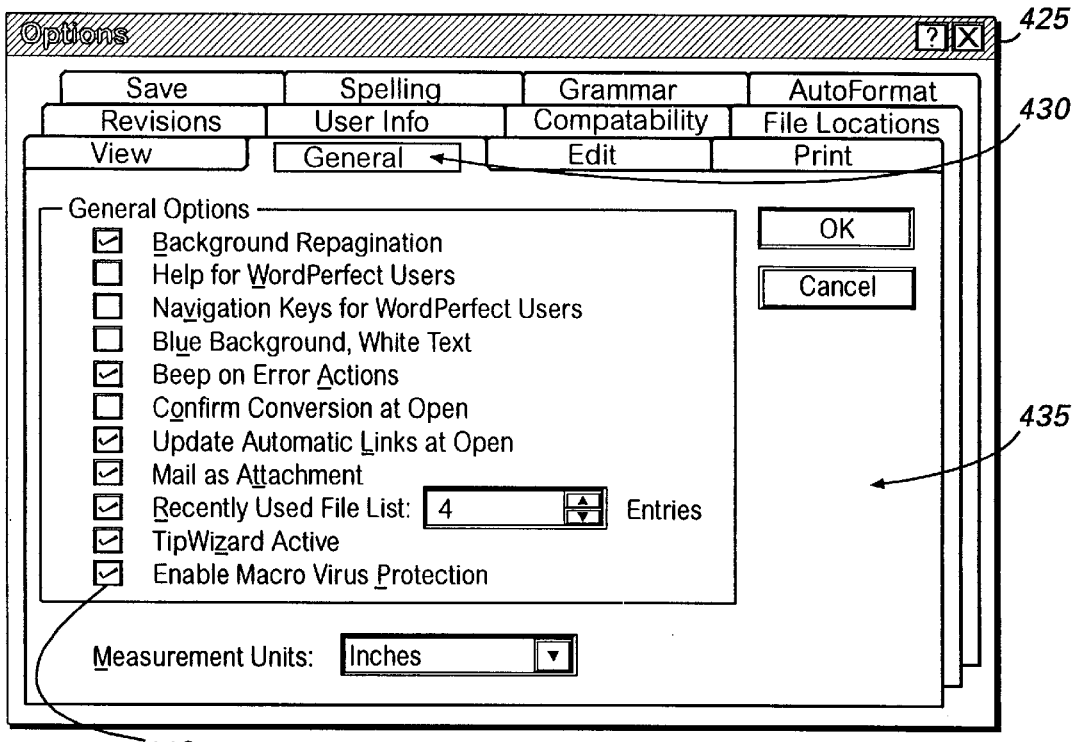
Figure 4C:
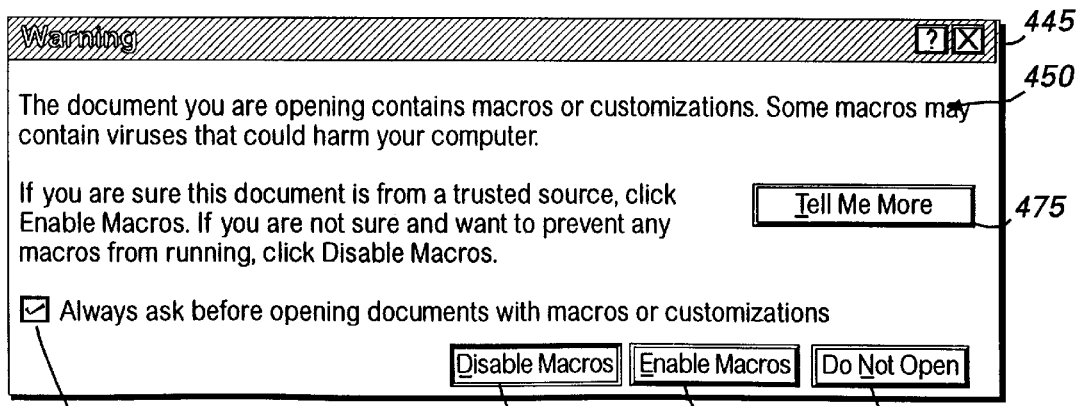

Referring now to FIGS. 4A, 4B, 4C, collectively described as FIG. 4, dialogs, also called dialog boxes, are shown for supporting the presentation of an advisory regarding the opening of a file that may contain a virus. FIG. 4A illustrates a dialog presenting an advisory notice regarding macro virus protection for a file to be opened by a program module, namely Microsoft's "WORD FOR WINDOWS 95" program. FIG. 4B illustrates a dialog presenting an option for allowing a user to turn off virus protection by a protection routine implemented as an internal component of a program module, specifically Microsoft's "WORD FOR WINDOWS 95" program. FIG. 4C illustrates an alternative dialog presenting an advisory notice regarding macro virus protection for a file to be opened by a program module, namely Microsoft's "WORD 97" program. The dialogs shown in FIG. 4A and 4C are generated upon completion of a series of protection checks completed by the protection routine. In contrast, the dialog shown in FIG. 4B is generated in response to selecting the Options choice from the Tools menu, and thereafter selecting the General tab presented by an Options dialog.

Turning first to FIG. 4A, a dialog 400 is presented on an output device, such as a monitor, to advise the user that the protection routine has determined that the file to be opened is likely to contain a virus. For example, in Microsoft's "WORD FOR WINDOWS 95", the dialog 400 presents an advisory 405 that warns the file to be opened contains a macro or customization and, consequently, may contain the macro virus. The dialog 400 includes three control buttons 410, 415, and 420, to allow the user to select a desired option for the open file operation. The control button 410, the "YES" option, permits the user to open the file in a "safe mode," i.e., the file is opened without macros or customizations, thereby preventing the possible spread of the macro virus to the data files residing on the data computer. This also prevents possible damage to data file content or to computer storage by denying the loading of macro or customization code. If the user believes that the file to be opened is "safe," i.e., a file for which the user believes is not infected by the macro virus, then the user can select control button 415, the "NO" option. This option opens the file with enabled macros and customization routines, which risks the possibility that the macro virus will spread to other data files on the computer. The user also can elect to terminate the open file operation by selecting the control button 420, the "CANCEL" option. This option prevents the completion of the open file operation.

Turning next to FIG. 4B, the user can elect to globally turn-off or disable virus protection by selecting the proper control presented by a display screen of the program module. For example, in Microsoft's "WORD FOR WINDOWS 95" program, a user can select "Options" from the "Tools" menu of the program, which causes a display of the "Options" dialog 425. Next, the user can select the "General" tab 430 from the "Options" dialog 425, which causes a display of a "General" dialog 435 within the framework of the "Options" dialog 425. At the "General" dialog 435, the user can select a control 440 to disable the macro virus protection provided by the protection routine. As shown in FIG. 4B, a checkmark within the checkbox of the control 440 operates to enable the macro virus protection. This is the preferred default setting of the control 440. The state of the control 440 determines the state of the Global flag, as will be described in more detail below with respect to FIGS. 5A and 5B.

Referring next to FIG. 4C, an alternative dialog 445 can be presented on an output device, such as a monitor, to advise the user that the protection routine has determined that the file contains a macro or customization and, consequently, may contain the macro virus. In contrast to the dialog described above with respect to FIG. 4A, the dialog in FIG. 4C also includes a control for enabling virus protection by the protection routine. For example, in Microsoft's "WORD 97", the dialog 445 presents an advisory 450 that warns the file to be opened contains a macro or customization and, consequently, may contain the macro virus. The dialog 445 includes three control buttons 455, 460, and 465, to allow the user to select a desired option for the open file operation. The control button 455, the "DISABLE MACROS" option, permits the user to open the file in a "safe mode," i.e., the file is opened without macros or customizations, thereby preventing the possible loading of the macro virus. If the user believes that the file to be opened is "safe," then the user can select control button 460, the "ENABLE MACROS" option. The user also can elect to terminate the open file operation by selecting the control button 465, the "DO NOT OPEN" option. A checkmark within the checkbox of a control 470, the default setting, operates to enable macro virus protection. A user can also select a control 475 ("TELL ME MORE") to learn more about virus protection and the options presented by the dialog 445.

Figure 5A:
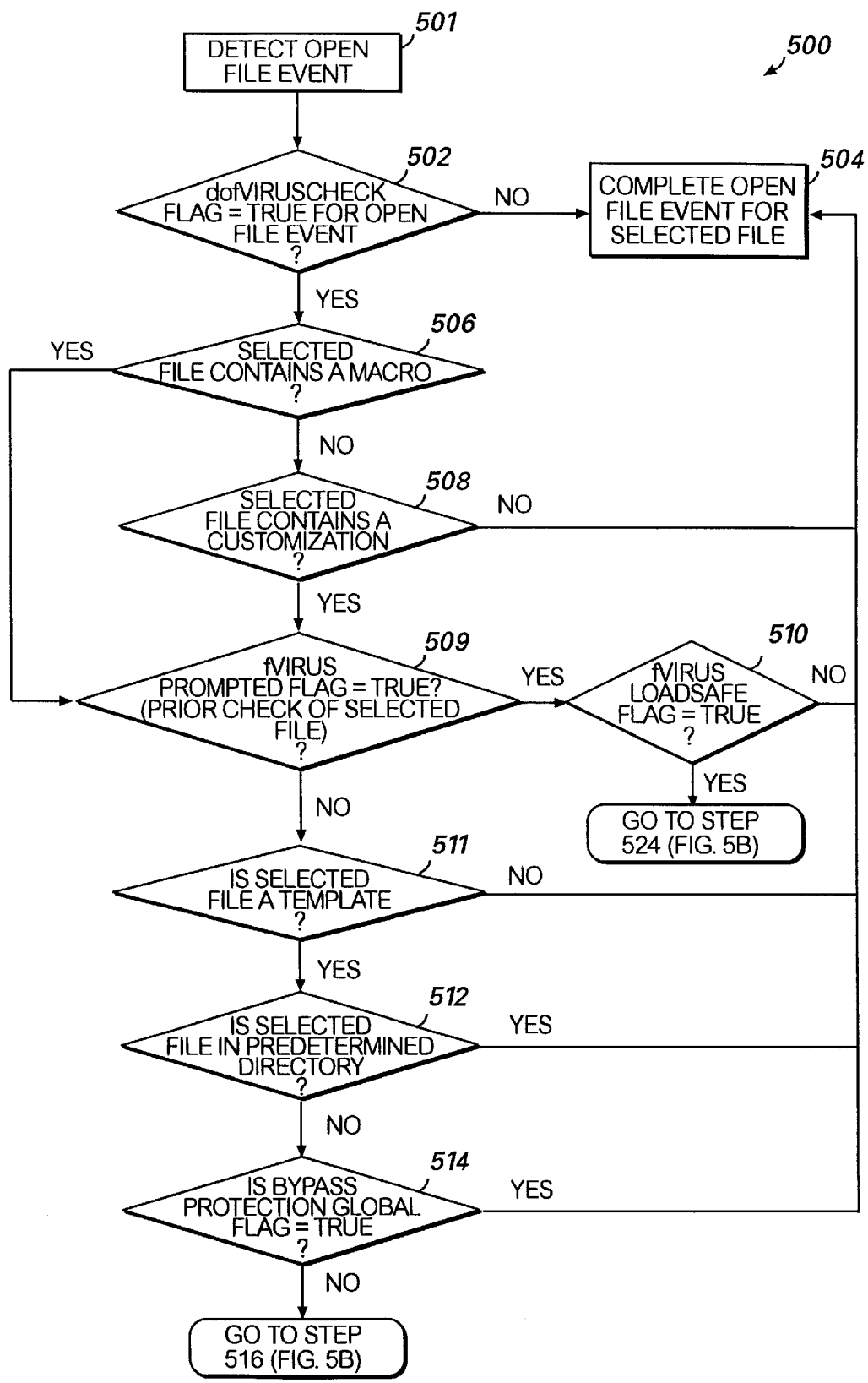
FIGS. 5A and 5B, collectively described as FIG. 5, are logical flow diagrams illustrating a method for protecting a computer file from infection by a virus in accordance with an exemplary embodiment of the present invention.
Figure 5B:
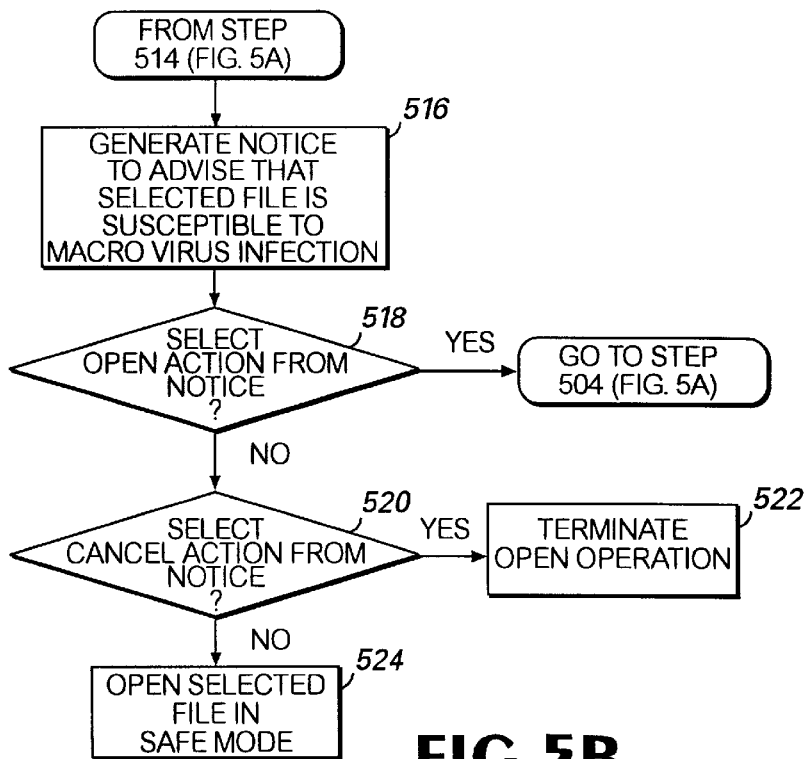

FIGS. 5A and 5B are logical flow diagrams illustrating a computer-implemented method for protecting a file, such as a document, from infection by a macro virus. Referring first to FIG. 5A, a virus check routine 500, also called a virus protection routine, is implemented within an executable program, such as the application program 36 (FIG. 1), and can check files prior to completion of an open file event to determine whether the files are likely to contain the macro virus. In step 501, an open file event, which initiates the opening of a selected file, is detected. Both external and internal open file events can be detected by the preferred routine 500 because it is incorporated within the program module operative to process the selected file.

In step 502, the open file event is examined to determine whether this action is likely to open a document infected by the macro virus. This inquiry is conducted at a code path level, internal to the program module, for the detected open file event. A dofVirusCheck flag is set to the true state if the corresponding action is associated with the opening of a file that may contain a macro virus. The inquiry examines the state of the dofVirusCheck flag to determine whether to initiate virus check operations or to open the file without virus protection. If the detected open file event is likely to result in the opening of a file that is not infected by the macro virus, i.e., the dofVirusCheck flag is false, then the "NO" branch is followed to step 504 to complete the conventional opening of the file. On the other hand, if the open file event is associated with a dofVirusCheck flag set to true, then the "YES" branch is followed from step 502 to step 506, thereby initiating virus check operations. In this manner, the virus check tasks of the routine 500 are completed only when required for a certain set of open file actions or events.

As part of the examination of the detected open file event in step 502, a dofVirusNotReadOnly flag can be passed along with the dofVirusCheck flag. If the dofVirusNotReadOnly flag is set to false for the action, then the selected file for this event can be opened in a "read only" mode. The present states of the dofVirusCheck flag and the dofVirusNotReadOnly flag are typically maintained in internal data structures for subsequent access by the routine 500.

In step 506, an inquiry is conducted to determine whether the file to be opened contains a macro. If so, the "YES" branch is followed from step 506 to step 509. Otherwise, the "NO" branch is followed to step 508. A determination is made in step 508 to decide whether the file to be opened contains a customization routine. If so, the "YES" branch is followed from step 508 to step 509. Otherwise, the "NO" branch is followed from step 508 to step 504 and the file is opened without virus protection. If the selected file does not contain a macro or a customization, then the file is not contaminated by a macro virus. In this case, there is no need to complete further virus check operations for the selected file, and it can be opened in a conventional manner.

In step 509, an inquiry is conducted to determine whether the file to be opened has been previously examined by the routine 500 during the present operating session of the program module. This inquiry can be readily accomplished by checking the state of a fVirusPrompted flag for the selected file. Although the default state of the fVirusPrompted flag is set to false to prompt a virus check of the corresponding file, this flag transitions to the true state if the file has been examined for virus infection during the present session. If the file has been previously checked during the present session, i.e., the fVirusPrompted flag is set to true, then the "YES" branch is followed from step 509 to step 510. If the file has not been checked by the routine 500 during the present session of the program module, then the fVirusPrompted flag is false and the "NO" branch is followed from step 509 to step 511. The state of the fVirusPrompted flag is preferably stored within dynamic memory of the computer.

A fCheckedVirus flag also can be set in step 509. The fCheckedVirus flag is set to the true state if the selected file contains a macro or customization, based on the determinations made in steps 506 and 508. The initial state of the fCheckedVirus flag is false.

In step 510, an inquiry is conducted to determine whether a fVirusLoadSafe flag is set to the true state. If the fVirusLoadSafe flag is true, then macros or customizations for the selected file should not be loaded for operation when the file is opened. If the response to this inquiry is negative, the "NO" branch is followed from step 510 to step 504 and the file is opened by conducting a normal open file operation. This results in opening the selected file with any attached macros or customizations. If the response to the inquiry in step 510 is positive, the "NO" branch is followed to step 524 to open the selected file in a "safe mode."

In step 511, a determination is made whether the file to be opened is a template. For the "WORD" program, a template is a master document having a selected set of document characteristics, such as basic text, formatting and layout. If the file is not a template, the "NO" branch is followed from step 511 to step 504 and the file is opened in a conventional manner. Otherwise, the "YES" branch is followed from step 511 to step 512 because the selected file is a template-type file. It will be appreciated that the inquiry of step 511 is not necessary and should not be performed if all file types can contain macros or customizations. On the other hand, if only selected files, such as templates, can contain macros and/or customizations, then the inquiry at step 511 is preferably conducted as part of the routine 500. For example, in Microsoft's "WORD FOR WINDOWS 95" program, only template-type files can contain macros or customizations, whereas all file types in Microsoft's "WORD 97" program can include macros or customizations.

In step 512, an inquiry is conducted to determine whether the file to be opened resides within a predetermined directory or any subdirectory of that predetermined subdirectory. If so, the "YES" branch is followed from step 512 to step 504 and the file is opened. Otherwise, the "NO" branch is followed from step 512 to step 514. For example, for Microsoft's "WORD FOR WINDOWS 95" program, the predetermined directories include the User Templates Directory, and the Workgroup Templates Directory, as well as any subdirectory for either of these directories. Files residing in these predetermined directories can be considered "safe" because it is unlikely that files in these locations would contain the macro virus.

In step 514, an inquiry is conducted to determine whether the user has elected to exercise the option of bypassing the default operation of virus protection. A certain global flag, the vrf.fVirusAlwaysDirty flag is set to true when the user elects the option of circumventing virus protection operations. For example, in the "WORD FOR WINDOWS '95" program, a user can turn-off default protection operations by selecting the Options dialog from the Tools menu, selecting the General tab to present the Options-General dialog, and selecting the appropriate check box in the Options-General dialog, as shown in FIG. 4B (if check box is checked, then virus protection is enabled). For the "WORD '97" program, the option to disable virus protection is presented as part of the notice which advises the user that a file to be opened is likely to contain a virus, as shown in FIG. 4C. In view of the foregoing, if the global flag is set to true, the "YES" branch is followed to step 504 and the file is opened in a normal manner without virus protection. Otherwise, the "NO" branch is followed from step 514 to step 516.

Continuing now with FIG. 5B, a notice is presented in step 516 to advise the user that the file to be opened may contain a macro virus. This warning notice, which is presented as a dialog of the program module, can display options for the open file operation, as evidenced by three control buttons: (1) "YES" (open document in safe mode); (2) "NO" (normal open operation); and (3) "CANCEL" (cancel open operation). Alternative versions of the notice are shown in FIGS. 4A and 4C.

In step 518, a determination is made whether the user has selected the "NO" control button to complete the normal open operation for the selected file. If so, the "YES" branch is followed from step 518 to step 504 and the file is opened in a conventional manner without virus protection. This results in opening the selected file with any macros or customizations loaded for operation. In addition, the fVirusLoadSafe flag is set to false for the selected file.

If the user does not select the "NO" control button, the "NO" branch is followed from step 518 to step 520. In step 520, an inquiry is conducted to determine whether the user has selected the "Cancel" control button to terminate completion of the open operation. If so, the "YES" branch is followed to step 522 and the file open operation is canceled. This terminates the open operation for the selected file. In addition, the fVirusLoadSafe flag is set to false for the selected file.

If the user does not select the "CANCEL" control button, then the only remaining option to select is the "YES" option, and the "NO" branch is followed from step 520 to step 524. In step 524, the user has selected the final remaining option, the "YES" control button, to open the file in the "safe mode." If the dofVirusNotReadOnly flag is set to false, then a Read Only flag is set to the true state for the selected file in response to the selection of the "YES" button. This marks the file as a "read only"-type file. In addition, the fVirusLoadSafe flag is set to the true state for the selected file in response to selecting the "YES" button. The states of the fVirusLoadSafe flag and the Read Only flag are examined prior to completing an open operation. If the fVirusLoadSafe flag is set to true, then macros or customizations for the selected file are not loaded for operation when the file is opened. In addition, if the Read Only flag is set to true, then the file is opened as a read only-type file.

For another exemplary embodiment, a digital signature check can be conducted to confirm whether the selected file is a "trusted" file that can be opened without virus protection. If a digital session key associated with the present session of the program module matches a digital signature assigned to the file to be opened, then this file has been previously processed by the program module during the present session. Based upon the signature match, the file can be opened without the necessity of generating a notice to advise that the selected file may contain a virus. The comparison of digital signatures provides an additional check to insure that the file has indeed been previously processed during the present session of the program module.

Each session of the program module can be assigned a digital session key, typically by the selection of a random number or another unique identifying characteristic. This digital session key is preferably assigned to the session when required, i.e., when there is a need to compare the digital session key with a digital signature for a selected file to be opened. This expedites the initialization of the program module because a digital session key is created only when there is a need to apply the key. However, once the session key is assigned to a present session, it remains assigned for that entire session.

A digital signature is assigned to a file after it has been checked by the virus check routine and thereafter saved during the present session. This digital signature is preferably saved with its corresponding file on a physical storage device. For example, the digital signature can be saved to a non-volatile storage mechanism of the computer, such as a hard disk drive. In addition, the states of certain flags for the file also can be saved to the non-volatile storage mechanism for subsequent access by the virus check routine. If this file is selected again for opening by the program module, a comparison can be made between the digital session key assigned to the present session and the digital signature assigned to the selected file. If a match results from this comparison, then the file can be opened without further examination based upon confirmation that this file has been previously checked during the session by the virus check routine.

Figure 6:
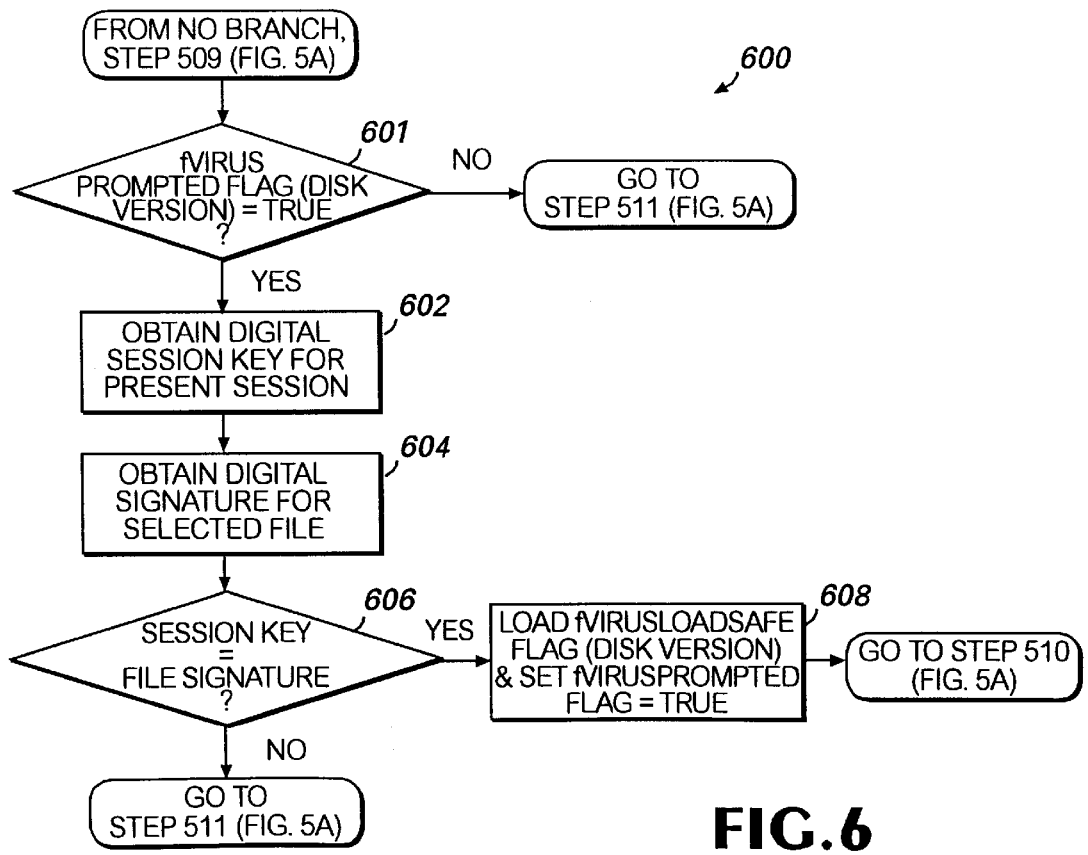
FIG. 6 is a logical flow diagram illustrating a method for verifying a digital signature assigned to a file in accordance with an exemplary embodiment of the present invention.

FIG. 6 is a logical flow diagram illustrating the steps for using an optional digital signature technique as a portion of the virus protection routine shown in FIGS. 5A and 5B. As shown in FIG. 6, the signature comparison routine 600 is preferably initiated upon completion of the tasks in step 509 of FIG. 5A. If the fVirusPrompted flag is set to true for the selected file, an indication is provided that the selected file has been previously checked by the virus check routine 500 during the present session of the program module. From step 509, the "NO" branch is followed to step 601. In step 601, an inquiry is conducted to determine whether a second fVirusPrompted flag is set to true for the selected file. In contrast to the fVirusPrompted flag examined in step 509, this second flag is stored within non-volatile memory of the computer. The disk-version of the fVirusPrompted flag is set to true in the event that the advisory notice has been previously presented to the user for the selected file. If this disk-stored version of the fVirusPrompted flag is true, the "YES" branch is followed to step 602. Otherwise, the "NO" branch is followed to step 511 (FIG. 5A).

To provide additional verification of the selected file, a signature check is conducted. In step 602, a digital session key is obtained for the present session. In step 604, a digital signature is obtained for the selected file. In step 606, an inquiry is conducted to determine whether the digital session key matches the digital signature for the file to be opened. If a match is not achieved, the "NO" branch is followed to step 511 (FIG. 5A) to continue the checking operations conducted by the virus check routine 500. If a match is achieved in step 606, the "YES" branch is followed to step 608. In step 608, a second fVirusLoadSafe flag, which is stored in non-volatile memory of the computer, is loaded for the selected file. The loading of this second fVirusLoadSafe operates to replace the fVirusLoadSafe flag maintained within an internal data structure of the computer. In addition, the fVirusPrompted flag maintained within an internal data structure is set to the true state. Upon completing these tasks in step 608, the process continues to step 510 (FIG. 5A).

It will be appreciated that the second fVirusPrompted flag and the second fVirusLoadSafe flag are saved to non-volatile memory when the selected file is saved. The digital signature assigned to the selected file is also saved to non-volatile memory when the selected file is saved. The digital signature, as well as these disk versions of the fVirusPrompted and fVirusLoadSafe flags, can be stored within the same location of the non-volatile storage mechanism.

Those skilled in the art will appreciate that an additional task can be conducted prior to step 601 in the event that there is a need to suppress presentation of the advisory notice for certain open file events. For example, in the "WORD 97" program, there is a need to suppress the presentation of advisory notices in certain situations involving OLE open file events. Consequently, for this embodiment, prior to step 601, an inquiry is conducted to determine whether a vrf-.fInsideOLEFileLoad flag is set to true. If so, the process proceeds to step 601 to check the state of the disk version of the fVirusPrompted flag. Otherwise, the process proceeds to step 511 to continue virus check operations. This effectively operates to restrict the number of open file events that can result in presentation of an advisory notice.

For an alternative embodiment using digital signature technology, a unique digital signature can be assigned to a particular user of a program module. Likewise, a unique digital signature can be assigned to other trusted entities, such as the vendor of the program module or the director of a corporate MIS department. Because digital signature technology relies upon the assignment of a unique digital signature to a trusted entity, standard security and cryptography techniques can be used to guarantee the security of each digital signature. The digital signature can be maintained in a secure location within memory of the user's computer. Upon completing the virus check tasks of the protection system, the digital signature is assigned to the selected file. When the selected file is closed, the digital signature is saved in parallel with the selected file. In response to loading the selected file for processing again by the program module, the digital signature assigned to the particular user is compared to the digital signature associated with the selected file. For example, if the MIS director is the user that saved the selected file, then the digital signature assigned to the MIS director is compared to the digital signature for the present user in response to loading the selected file again. A match serves to confirm that the file is unlikely to contain a virus because virus check tasks have been previously conducted for this file. For this embodiment, a file validation can be completed based upon use of the digital signature alone, thereby eliminating a need for a digital session key.

In summary, the present invention can protect a file to be opened by a program module from possible virus infection by advising a user that the selected file may contain a virus. In additon, the present invention can prevent possible damage to data file content or to information residing in computer storage by opening the selected file without a component that may be associated with a potential virus. If the file to be opened is likely to contain a virus, a notice or alert can be presented to the user to support an informed decision of whether to proceed with the open file operation. The present invention can be implemented as a virus protection routine installed within the code structure of the program module. This allows the protection routine to directly handle the detection of both internal and external open file events, thereby extending the scope of virus protection to open file events that separate or independent programs are unable to trap and process.

It will be understood that the embodiments disclosed have been disclosed by way of example, and that other modifications may occur to those skilled in the art without departing from the scope and spirit of the appended claims.

What is claimed is:

1. A computer-implemented method for protecting files on a computer from infection by a virus, the files compatible with a program module running on the computer, comprising the steps of:

detecting one of an external and internal open file event for a selected one of the files;

prior to responding to the detected open file event, determining whether the selected file is likely to contain the virus;

in the event that the selected file is likely to contain the virus, then providing a notice advising that the selected file may contain the virus;

otherwise, responding to the open file event by opening the file for operation with the program module.

2. The computer-implemented method of claim 1 further comprising the step of opening the selected file for operation with the program module in response to selecting an open file option presented by the notice.

3. The computer-implemented method of claim 2 further comprising the step of terminating a response to the open file event in response to selecting a close file option presented by the notice, thereby preventing an opening of the selected file.

4. The computer-implemented method of claim 3 further comprising the step of opening the selected file in a safe mode in response to selecting a virus protection option presented by the notice, wherein the selected file is opened in the safe mode as a protected file that does not include any components associated with the virus.

5. The computer-implemented method of claim 4 wherein the virus is a macro virus and the protected file is loaded for operation with the program module without loading any macro of the selected file.

6. The computer-implemented method of claim 5 wherein the protected file is marked as read-only to make it difficult for the selected file to be saved as a replacement for the selected file.

7. The computer-implemented method of claim 1 wherein the determining step comprises determining whether the selected file comprises a component associated with the virus and, if so, identifying the selected file as likely to contain the virus.

8. The computer-implemented method of claim 1 wherein the determining step comprises determining whether the selected file has been previously examined for virus infection and, if so, identifying the selected file as a clean file that does not contain the virus.

9. The computer-implemented method of claim 1 wherein the determining step comprises:

determining whether the selected file comprises a component associated with the virus;

if the selected file comprises a component associated with the virus, then determining whether the file is a predetermined type that is unlikely to contain the virus;

if so, identifying the selected file as available for operation with the program module;

otherwise, identifying the selected file as likely to contain the virus.

10. The computer-implemented method of claim 9 wherein the virus is a macro virus and the component of the selected file is a macro.

11. The computer-implemented method of claim 9, wherein the step of determining whether the file is a predetermined type comprises checking whether the selected file resides in a predetermined directory.

12. The computer-implemented method of claim 9, wherein a digital signature is assigned to the selected file when the selected file is examined for virus protection, and wherein the step of determining whether the file is a predetermined type comprises checking the digital signature of the selected file to determine whether the file was previously opened by a trusted entity.

13. A computer-readable medium having computer executable instructions for a virus protection routine incorporated within a program module, for causing a computer to perform the steps of:

detecting a request to access a data file in response to one of an external and internal open file event;

in response to the request to access the data file, determining whether the data file contains a known virus component;

if the data file contains a known virus component, then
   (i) providing an advisory notice that the data file is susceptible to infection by a virus; and (ii) providing an option to access the data file using a safe mode; and if the option to access the data file in the safe mode is selected, then accessing the data file with the known virus component disabled.

14. The computer-readable medium of claim 13, having further computer executable instructions for causing the computer to perform the steps of:

providing an option to access the data file in an unrestricted mode; and if the option to access the data file in an unrestricted mode is selected, then accessing the data file with the known virus component enabled.

15. The computer-readable medium of claim 13, having further computer executable instructions for causing the computer to perform the steps of:

providing an option to cancel the access to the data file; and if the option to cancel the access to the data file is selected, then canceling the request to access the data file.

16. The computer-readable medium of claim 13, wherein the step of determining whether the data file contains a known virus component comprises:

if the known virus component is a macro, then determining whether the data file contains a macro.

17. The computer-readable medium of claim 13, wherein the step of determining whether the data file contains the known virus component comprises the step of:

if the known virus component is a customization, then determining whether the data file contains a customization.

18. The computer-readable medium of claim 13, wherein the step of detecting a request to access a data file comprises detecting an external file open event or detecting an internal file open event.

19. The computer-readable medium of claim 13, wherein the step of accessing the data file with the known virus component disabled comprises accessing the data file in a read-only mode.

20. The computer-readable medium of claim 13, having further computer executable instructions for causing the computer to perform the steps of:

if the data file contains a known virus component, then determining whether the data file resides in a predetermined directory; and if the data file resides in a predetermined directory, then accessing the data file with the known virus component enabled.

21. The computer-readable medium of claim 13, wherein a digital signature is assigned to the data file to indicate that the data file has been examined for infection by a virus and to indicate whether the data file has been accessed in the safe mode, and wherein the computer-readable medium has further computer executable instructions for causing the computer to perform the steps of:

if the data file contains a known virus component, then checking the digital signature for the data file to determine whether the data file has been previously examined for infection by a virus; and if the data file has been previously examined for infection by a virus, and if the digital signature indicates that the data file has been accessed in the safe mode, then accessing the data file with the known virus component disabled.

22. A computer-implemented method for protecting a plurality of files on a computer from infection by a known virus component using a virus check routine incorporated within a program module, the program module operative to access the files and the virus check routine operative to store a digital signature with a selected data file once the selected data file is accessed by the program module, comprising the steps of:

detecting a request to access the selected data file in response to one of an external and internal open file event;

determining whether the selected data file contains the known virus component;

if the selected data file contains the known virus component, then determining whether the selected data file was previously accessed by the program module by (i) obtaining the digital signature for the selected data file;

(ii) obtaining a digital session key for the present session of the program module; and (iii) comparing the digital signature with the digital session key;

if the digital signature matches the digital session key, then determining that the selected data file was previously accessed by the program module;

determining whether the selected data file was previously accessed using a safe access mode; and if the selected data file was previously accessed using the safe access mode, then accessing the selected data file using the safe access mode.

23. The computer-implemented method of claim 22, wherein the step of accessing the selected data file using the safe access mode comprises accessing the selected data file without the known virus component.

24. The computer-implemented method of claim 22, wherein the step of accessing the selected data file using the safe access mode further comprises accessing the selected data file in a read-only mode.

25. The computer-implemented method of claim 22, further comprising the steps of:

if the digital signature does not match the digital session key, then (i) displaying an advisory message warning that the selected data file is susceptible to infection by a virus; and (ii) providing an option to process the selected data file using the safe access mode; and if the option to process the selected data file using the safe access mode is selected, then accessing the selected data file without the known virus component;

otherwise, accessing the selected data file with the known virus component.

26. A computer-implemented method for detecting a known virus component using a virus check routine incorporated within a program module operative to process a file that is susceptible to a virus, comprising:

detecting a request to process a selected file in response to one of an external and internal open file event;

determining whether the selected file contains a known virus component;

if the selected file contains a known virus component, then (i) providing an advisory notice indicating that the selected file contains a known virus component; and (ii) providing file processing options to process the selected file;

receiving one of the file processing options as a selected file processing option;

processing the selected file in accordance with the selected file processing option;

detecting a second request to process the selected file; and if the advisory notice indicating that the selected file contains a known virus component was previously provided, then processing the selected file in accordance with the selected file processing option without providing a second advisory notice.

27. The computer-implemented method of claim 26, wherein the file processing options comprise:

a safe mode file processing option to process the selected file without the known virus component;

an unrestricted mode file processing option to process the selected file with the known virus component; and an abort mode file processing option to abort processing the selected file.

28. The computer-implemented method of claim 26, wherein the step of processing the selected file in accordance with the selected file processing option comprises assigning a digital signature to the selected file.

29. The computer-implemented method of claim 28, wherein the step of detecting a second request to process the selected file comprises:

obtaining the digital signature for the selected file;

obtaining a digital session key for the present session of the program module; and comparing the digital signature for the selected file with the digital session key for the present session of the program module;

if the digital session key and the digital signature match, then detecting a second request to process the selected file.

30. The computer-implemented method of claim 26, wherein the step of detecting a request process a selected file comprises detecting an internal or external open file command.

31. The computer-implemented method of claim 26, wherein the step of determining whether the selected file contains a known virus component comprises determining whether the selected file contains a macro.

32. The computer-implemented method of claim 26, wherein the step of determining whether the selected file contains a known virus component comprises determining whether the selected file contains a customization.

33. The computer-implemented method of claim 26, further comprising the step of determining whether the selected file is a template.

34. The computer-implemented method of claim 26, further comprising the step of determining whether the selected file is located in a predetermined directory.

* * * * *